United States Patent
Lewkovitz

(10) Patent No.: US 9,063,803 B1
(45) Date of Patent: Jun. 23, 2015

(54) RICH RECORDING AND PLAYBACK OF PROGRAM EXECUTION

(71) Applicant: Amazon Technologies, Inc., Seattle, WA (US)

(72) Inventor: Adam Jonathan Lewkovitz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 13/872,753

(22) Filed: Apr. 29, 2013

(51) Int. Cl.
*G06F 13/00* (2006.01)
*G06F 9/54* (2006.01)

(52) U.S. Cl.
CPC .................................... *G06F 9/542* (2013.01)

(58) Field of Classification Search
CPC ....................................................... G06F 9/542
USPC ......................................................... 719/318
See application file for complete search history.

(56) References Cited

U.S. PATENT DOCUMENTS

| 7,673,035 | B2 * | 3/2010 | Stevenson et al. | 709/224 |
| 8,578,340 | B1 * | 11/2013 | Daudel et al. | 717/129 |
| 2010/0132038 | A1 * | 5/2010 | Zaitsev | 726/22 |
| 2013/0111451 | A1 * | 5/2013 | Che et al. | 717/128 |

* cited by examiner

*Primary Examiner* — Andy Ho
(74) *Attorney, Agent, or Firm* — Lee & Hayes, PLLC

(57) ABSTRACT

Information regarding the execution of a program is recorded. A program execution monitor detects the occurrence of events related to the execution of the program. In response to detecting an event, the program execution monitor creates an entry in an event list identifying the event and the time at which the event occurred. A playback component may utilize the event list to play back the recording of the program at a time corresponding to an identified event. In other embodiments, the program execution monitor stores the operational state of a program at the time an event is detected. The stored operational state can be utilized to recreate the state of the program at the time the event was detected and restart execution of the program at that time. Other types of inputs to the program might also be recorded and played back.

19 Claims, 7 Drawing Sheets

RICH RECORDING AND PLAYBACK OF PROGRAM EXECUTION

BACKGROUND

Software developers commonly provide promotional materials to software retailers for use in marketing software products. For example, a developer of a software product might provide one or more screen captures of a software product in operation to a software retailer. The software developer might also provide a textual description of the software product. The software retailer might then utilize the promotional materials provided by the software developer when marketing the software product, such as on an e-commerce Web site, in an online software application store, or in another manner.

The promotional materials provided by a software developer for a software product might not provide the best representation of the functionality or experience provided by the software product. For example, a software developer might provide static screen captures showing only a certain subset of the functionality provided by a software product. Moreover, the screen captures might not express the rich sensory experience provided by certain types of software products, such as video games and other types of multimedia software products. Additionally, someone without a marketing or artistic background might create the text description of the software product provided by the software developer. As a result, the promotional materials provided by a software developer for a software product might not generate strong consumer interest in the software product.

Some software retailers create their own promotional materials for software products to supplement or replace those provided by the developer. The creation of compelling promotional materials may, however, require the software retailer to devote significant financial and other types of resources. Many software retailers are unable, or unwilling, to commit these sometimes significant resources. As a result, some software developers and retailers may experience low sales of certain software products.

The disclosure made herein is presented with respect to these and other considerations.

DETAILED DESCRIPTION

Figure 1:
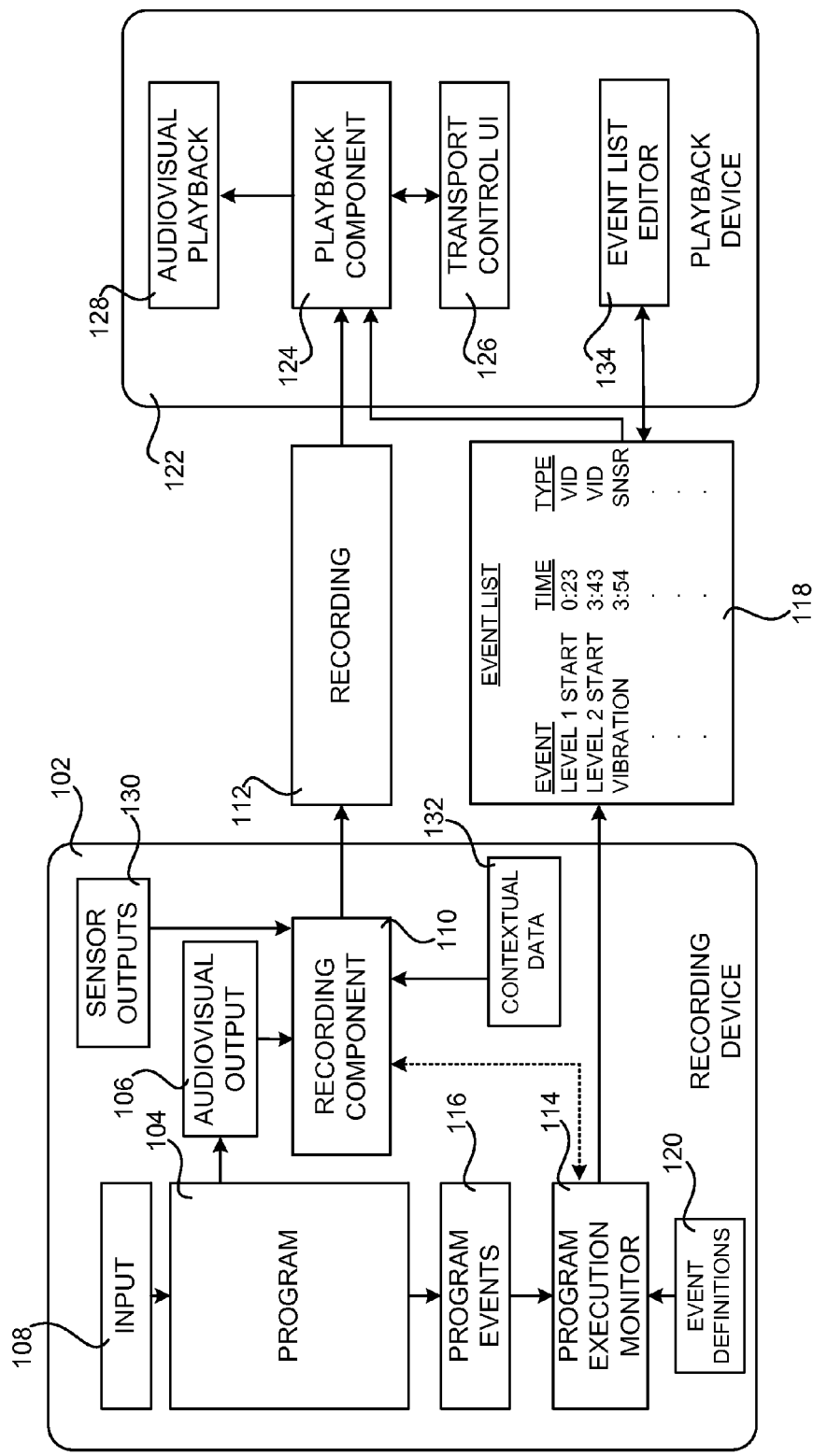
FIG. 1 is a software architecture diagram showing an overview of one illustrative mechanism described herein for rich recording and playback of program execution, according to one embodiment disclosed herein.

The following detailed description is directed to technologies for rich recording and playback of program execution. Utilizing the technologies described herein, a recording of the execution of a program can be created that describes rich aspects of the execution of the program, such as aspects of the environment in which the program was executing, output captured by various sensors while the program is executing, and output generated by the program that would not be captured by a standard recording of the audiovisual output of the program. This type of recording of a software product may be utilized as promotional material in conjunction with an advertisement for the software product, such as on an e-commerce Web site, in an online software application store, or in another manner. For example, an e-commerce Web site might be configured to play back such a recording of a software program, including playback of the other recorded aspects of the operation of the program such as outputs generated by the program. This type of recording of the execution of a software product might also be utilized during testing of the operation of the software product and/or in other ways.

According to one aspect presented herein, a computer-implemented mechanism is disclosed for rich recording and playback of the execution of a computer program. In one embodiment, a recording is created while a program is executed. The recording might include the audiovisual output of the program. For example, an recording component might record the audio and video output of the program during execution to a file in a standard or non-standard recording format. The recording might also include other data, such as outputs from sensors recorded while the program is executing, contextual data regarding the conditions under which the program was executed, inputs received to the program and/or computing device upon which the program is executing and, potentially other information. The recording might be made while a user is testing the operation of the program or using the program in other ways.

During execution of the program, a program execution monitor also monitors the execution of the program for the occurrence of one or more program events (which may be referred to herein as "events"). The program events might be events that are specified by the programmer of the program (e.g. flags that are set during execution of the program to signify that an event has occurred or certain comments inserted into the program 104), input events, or output events. Input events include, but are not limited to, inputs made to user input devices on the computing system executing the program such as key presses, touch tablet or screen presses, or other types of inputs made to other types of input devices. Output events include, but are not limited to, outputs made by the device executing the program, such as the operation of a vibration motor or other type of output component or device. Other types of program events might also be detected.

When the program execution monitor detects the occurrence of an event, the program execution monitor is configured to create an entry in an event list. The entry in the event list includes data that describes the event that occurred and a corresponding time in the audiovisual recording of the program output at which the event occurred. The entry might also specify the type of event or other information. In this way, events occurring during the execution of the program can be detected and correlated with the time that they occur in the recording. As will be described in greater detail below, the information stored in the event list may be utilized to play back the data contained in the recording at a desired location. The information stored in the event list might also be utilized to play back output events generated by the program that are not captured by an audiovisual recording, such as the activation of a vibration motor or other type of output device or component.

In order to play back the recording of the program, a playback component may provide a user interface for presenting some or all of the events identified in the event list. A user may be permitted to select one of the events in the event list through the user interface. In response to receiving such a selection, the playback component plays back some or all of the recording beginning at or around the time specified in the event list that corresponds to the selected event. In this way, a user can begin playback of the recording at or around the time a detected program event occurred at recording time. For example, the audiovisual portion of the recording may be played back. Other information captured in the recording, such as sensor outputs recorded while the program was executing might also be played back together with or separately from the audiovisual recording.

In some embodiments, the playback component is also configured to play back certain types of events identified in the event list that are not captured in the audiovisual recording. For example, if, during playback of the recording, the playback component identifies an entry in the event list having an associated time that occurs during playback of the recording, the playback component might play back the identified event. For instance, if the playback component determines that a vibration motor was activated at a certain point during execution of the program, the playback component might cause a vibration motor to be activated at the same time during playback of the recording. If the device upon which playback is occurring does not include hardware (e.g. a vibration motor) or software necessary to play back the identified event, the event might be presented on-screen using text or indicated in another manner.

In another embodiment, the operational state of an executing program is also saved when a program event is detected during recording. The operational state may include the contents of random access memory ("RAM"), central processing unit ("CPU") registers, and other data that can be utilized to later recreate the state of the program at the time the event was detected and to re-start execution of the program from that point in time. When an event occurs, an entry might also be created in the event list that identifies the detected event and the saved operational state of the program at the time the event occurred. In this embodiment, the program execution monitor might also record input made to the program during execution for use in playback at a later time.

In order to play back the execution of the program in this embodiment, a playback component may provide a user interface for presenting some or all of the events identified in the event list. A user may be permitted to select one of the events in the event list through the user interface. In response to receiving such a selection, the playback component loads the program operational state that is associated with the selected event. The program operational state may then be utilized to restore the state of the program at the time the event occurred and to begin execution of the program at that time. In this way, a user can restart execution of a program at or around the time a detected program event occurred during a previous execution of the program. Additionally, input to the program recorded during a previous execution of the program might be played back to the program during the subsequent execution of the program. Additional details regarding the various components and processes described above for rich recording and playback of program execution will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein might also be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing an overview of one illustrative mechanism described herein for rich recording and playback of program execution, according to one embodiment disclosed herein. As shown in FIG. 1, a recording device 102 might be utilized in embodiments disclosed herein to execute a program 104. The recording device 102 might be any type of computing device capable of executing a program 104 such as, but not limited to, a desktop, laptop, or server computer, a smartphone, a tablet device, an e-reader, or another type of computing device. The program 104 might be a game, an application program, a utility program, or another type of computer program.

As shown in FIG. 1, the program 104 is configured to generate an audiovisual output 106 in one implementation. The audiovisual output 106 may be presented on a display screen of the recording device 102. For example, when the program 104 is a game, the audiovisual output 106 might include the on-screen visuals generated by the game along with any sounds generated by the game. Other types of programs 104 might generate other types of audiovisual output 106.

As also shown in FIG. 1, the program 104 might be configured to receive various types of input 108. For example, the program 104 might be configured to receive and process input 108 from various input devices and/or sensors (not shown in FIG. 1) of the recording device 102. Example input devices and/or sensors include, but are not limited to, hardware buttons, keyboards, touch pads, touch screens, gyroscopes, global positioning system ("GPS") sensors, magnetic compass devices, audio and video input devices, light sensors, cameras, and others.

In a similar fashion, the program 104 might be configured to generate various outputs using output devices provided by the recording device 102. For example, and without limitation, the program 104 might be configured to provide various types of output via a display screen, an audio output device, light emitting diodes ("LEDs"), liquid crystal displays ("LCDs"), vibration devices, and other types of output devices. Different types of programs 104 might make different types of uses of the various input and output devices described above.

A recording component 110 might also be executed on the recording device 102 in one implementation. The recording component 110 is a software component configured to record various types of information, such as the audiovisual output 106 of the program 104, to create a recording 112. The audiovisual portion of the recording 112 might be formatted using a standard or non-standard digital video recording format. For example, the audiovisual portion of the recording 112 might be formatted using one of a number of standards available from the Moving Pictures Expert Group ("MPEG"), such as MPEG-1, MPEG-2, or MPEG-4. Other formats might also be utilized. In some implementations, the recording component 110 is a software or hardware component that is external to the recording device 102.

According to various embodiments, the recording component 110 might also be configured to record other information during execution of a program 104. For instance, and without limitation, the recording component 110 might also be configured to record the input 108 received by the program 104 during execution. The recording component 110 might also be configured to record various sensor outputs 130 made during execution of the program 104, regardless of whether the sensor outputs 130 are provided to the program 104. The sensor outputs 130 include, but are not limited to, the outputs from a camera, a microphone, a GPS sensor, a gyroscope, an accelerometer, a temperature sensor, an altitude sensor, a magnetic compass, and/or other types of sensor outputs. In this way, for example, a recording 112 can be made that indicates the location of the device 102 when the program 104 was executed, the sound level when the program 104 was executed, the altitude and/or orientation of the device 102 when the program was executed and, potentially, other information of interest.

The recording component 110 might also be configured to record contextual data 132 at the time the program 104 is executed. The contextual data 132 may include information regarding the context in which the program 104 was executed such as, but not limited to, the time at which the program 104 was executed, data identifying other programs executing on the device 102 when the program 104 was executed, the amount of RAM and/or storage available on the device 102 and/or used by the program 104, information regarding the health of the device 102, and/or other information regarding the context in which the program 104 was executed.

The recording component 110 might also be configured to record information identifying the particular portion of the program 104 that is executing at a particular time. For example, the recording component 110 might store data in the recording 112 identifying the particular portion of the program 104 that was executing when certain sensor outputs 130 were received. The recording component 110 might also store data in the recording 112 identifying the particular portion of the program 104 that was executing when other types of events occurred. This information might be displayed to a user upon playback of the recording 112 in the manner described below.

The recording component 110 might also be configured to create a textual transcript of operations performed by the program 104. For example, the recording component 110 might create a textual transcript indicating that a program called a certain application programming interface ("API"), communicated with another program or computer, utilized a peripheral device, detected certain input (e.g. mouse movement), loaded or stored data, or engaged in other types of activities. Such a transcript might be played back in synchronization with the other data stored in the recording 112 in the manner described below.

As shown in FIG. 1, a program execution monitor 114 might also be executed on the recording device 102 in one implementation. The program execution monitor 114 is configured to monitor execution of the program 104 and to detect the occurrence of one or more program events 116 that occur with respect to the execution of the program 104. The program events 116 might be events that are specified by the programmer of the program 104 (e.g. flags that are set during execution of the program 104 to signify that an event has occurred or comments in the program 104), input events, output events, or system events.

As mentioned briefly above, input events include, but are not limited to, input 108 made to the program 104 by way of user input devices on the recording device 102, such as key presses, touch sensor or touch screen presses, plugging the device 102 into power or into another device, changing networks, detecting vibrations, detecting changes in orientation or altitude, or other types of input 108 made to other types of input devices or sensors. Output events include, but are not limited to, outputs made by the program by way of the recording device 102, such as the operation of a vibration motor or other type of output component within the recording device 102. System events include, but are not limited to, available memory falling below a certain point, battery power falling below a certain level, other resources being above or below a certain point, and/or other information related to the operational state of the device 102. Other types of program events 116 might also be detected in other embodiments.

In one embodiment, event definitions 120 are provided to the program execution monitor 114 that specify the types of program events 116 that the program execution monitor 114 should monitor for. A user might be permitted to add to, modify, or remove program events 116 from the event definitions 120. Additionally, program components might also be permitted to add program events 116 to the event definitions 120. For example, a program might identify a program event 116 of interest through analysis of a log file generated by the program 104. In response thereto, the program might add the identified program event 116 to the event definitions 120. The program events 116 specified in the event definitions 120 might also be modified manually or automatically in other ways by other components and/or systems in other embodiments. Moreover, in addition to the use of the event definitions 120, the program execution monitor 114 might also be configured to detect the occurrence of certain program events 116 in other ways in other embodiments.

In one implementation, the program execution monitor 114 is configured to detect the start of the execution of the program 104. The program execution monitor 114 might also be configured to start the execution of the program 104. Contemporaneously with the start of the execution of the program 104, the program execution monitor 114 might also instruct the recording component 110 to begin recording. In turn, the recording component 110 begins creating the recording 112 by recording the audiovisual output 106, the input 108, the sensor outputs 130, the contextual data 132 and, potentially, other information. Although the recording 112 is shown in FIG. 1 as a single file, multiple files might be utilized to create the recording 112. Additionally, time code or another type of metadata might also be stored with the recording 112 so that playback of the various types of recorded data can be synchronized.

Once execution of the program 104 has started, the program execution monitor 114 begins monitoring for the occurrence of the program events 116. If the program execution monitor 114 detects the occurrence of a program event 116, the program execution monitor 114 creates an entry in an event list 118. In the embodiment shown in FIG. 1, each entry in the event list 118 includes data that describes the program event 116 that occurred and a corresponding time in the recording 112 at which the detected program event 116 occurred. Each entry might also include information describing the type of event, such as an on screen (video) event, a sensor event, an input event, or another type of event. In this way, program events 116 occurring during the execution of the program 104 can be detected and correlated with the time that they occurred in the recording 112. This information can then be utilized during playback, as described below.

In the example shown in FIG. 1, the program 104 is a game. In this example, the programmer of the program 104 has inserted flags or comments into the program 104 that will cause program events 116 to be generated each time a player starts a new level. Additionally, event definitions 120 have been created that define events of interest as including output events, such as the operation of a vibration device in the recording device 102. Consequently, the event list 118 includes entries corresponding to the start of a first level in the program 104 (occurring at 0:23 in the recording 112), the start of a second level in the program 104 (occurring at 3:43 in the recording 112), and the operation of a vibration device in the recording device (occurring at 3:54 in the recording 112). The event list 118 might also include other entries not shown in FIG. 1.

As will be described in greater detail below, the entries stored in the event list 118 may be utilized to play back the recording 112 at a desired location. The entries in the event list 118 might also be utilized to play back output events generated by the program 104 that are not directly captured in an audiovisual recording, such as the activation of a vibration device or other type of output device or component. Additional details regarding this process will be provided below.

It should be appreciated that the entries stored in the event list 118 shown in FIG. 1 are merely illustrative and that many other types of program events 116 might be detected and identified in the event list 118. For example, and without limitation, various types of program events 116 might include the calling of an API, execution of the program 104 entering a new section of code, a user starting a new program on the recording device 102, the program 104 completing execution and returning control to an operating system, and/or other types of user and system events. These examples are merely illustrative and should not be considered as limiting the scope of this application.

In one embodiment, a playback device 122 is configured to play back the recording 112 and, potentially, other types of output events identified in the event list 118. The playback device 122 might be any type of computing device capable of executing the playback component 124 such as, but not limited to, a desktop, laptop, or server computer, a smartphone, a tablet device, an e-reader, or another type of computing device.

In order to play back the recording 112, the playback component 124 may provide a transport control user interface 126 (which may be referred to as a "user interface" or a "UI") in some embodiments for presenting some or all of the events identified in the event list 118. A user may be permitted to select one of the events identified in the event list 118 through the UI. The user might also be able to select the various types of information contained in the recording 112 that should be played back. For example, the user might select that the audiovisual portion of the recording 112 be played back along with one or more of the sensor outputs 130. In response to receiving such a selection, the playback component 124 plays back some or all of the components of the recording 112.

For example, the playback component 124 might play back the audiovisual portion of the recording 112 to generate the audiovisual playback 128. The playback component 124 might also play back the other information in the recording alone or in synchronization with the audiovisual portion of the recording 112. For example, the playback component 124 might play back the audio recording from a microphone during the original execution of the program 104. Similarly, the playback component 124 might play back images recorded from a camera in the recording device 102 during the original execution of the program 104. The playback component 124 might also display the transcript described above in synchronization with the playback of other data contained in the recording 112.

The playback component 124 might also present the contextual data 132 and/or other information regarding the original execution of the program 104 contained in the recording 112. The playback component 124 might also display information contained in the recording 112 identifying the particular portion of the program 104 that was executing when a program event 116 occurred, when certain input was received, when certain outputs were performed, or when other conditions occurred.

The playback of the recording 112 begins at or around the time specified by the entry in the event list 118 that corresponds to the event selected by the user. In this way, a user can begin playback of the recording 112 at or around the time a detected program event 116 occurred during the original execution of the program 104. The particular event that should be played back might also be selected in other ways. For instance, a user might be permitted to select events in the event list 118 for playback based upon their type or other attribute.

In some embodiments, the playback component 124 is also configured to play back certain types of events identified in the event list 118 that are not captured in the audiovisual portion of the recording 112. For example, the playback component 124 might identify an entry in the event list 118 that has an associated time that occurs during playback of the recording 112. In this case, the playback component 124 might play back the identified event. For instance, in the example shown in FIG. 1, a user might request that playback of the recording 112 begin at the start of level two. In response thereto, the playback component 124 may begin playback at 3:43 from the start of the recording 112.

Based upon an analysis of the event list 118, the playback component 124 might also determine that a vibration device was activated at 3:54 into the recording 112. In response thereto, the playback component 124 might cause a vibration motor in the playback device 122 to be activated at the same time (i.e. at 3:54) during playback of the recording 112. If the playback device 122 does not include hardware (e.g. a vibration device) or software necessary to play back the identified event, the playback component 124 might present the event on-screen using text or indicated in another manner. For instance, the playback component 124 might display the word "VIBRATION" overlaid on the audiovisual playback 128 to convey to the viewer that vibration occurred at that point in time.

It should be appreciated that the recording and playback processes described above might be repeated utilizing multiple recording devices 102. For example, in one implementation the recording device 102 is a smartphone. In this implementation, the process described above might be repeated utilizing various smartphone models from different manufacturers. In this way, a unique recording 112 and associated event list 118 can be created for each smartphone. The recording 112 can then be played back in the manner described above to indicate to the viewer precisely how the program 104 will perform on each device. In some implementations, the recording 112 for several different recording devices 102 might be synchronized and played back side-by-side so that a viewer can more easily identify differences between the execution of the program 104 on different devices.

In some embodiments, the mechanism described above might also be utilized to provide advertising for the program 104. In particular, the audiovisual playback 128 of the recording 112 of the program 104 may be utilized as promotional material in conjunction with an advertisement for the program 104, such as on an e-commerce Web site, in an online software application store, or in another manner. For example, an e-commerce Web site might be configured to play back some or all of the recording 112 of a program 104, including playback of the other recorded aspects of the operation of the program 104 such as outputs generated by the program 104. The mechanism described above for recording and playing back the audiovisual and other types of output of a program 104 might also be utilized during testing of the operation of the program 104 and/or in other ways.

As shown in FIG. 1, the playback device 122 is also configured with an event list editor 134 in some embodiments. The event list editor 134 provides functionality for allowing a user to create, delete, modify, group, or otherwise interact with the events in the event list 118. For example, during playback of the recording 112, a user might add an event to the event lists 118 that is interesting to the user. The user might also delete events from the event list 118 to create an event list 118 that includes only events of interest to the user. The event list editor 134 might also provide other types of functionality for modifying the event list 118. In other embodiments, a programmatic interface might also be provided for allowing programs to modify the contents of the event list 118.

Figure 2:
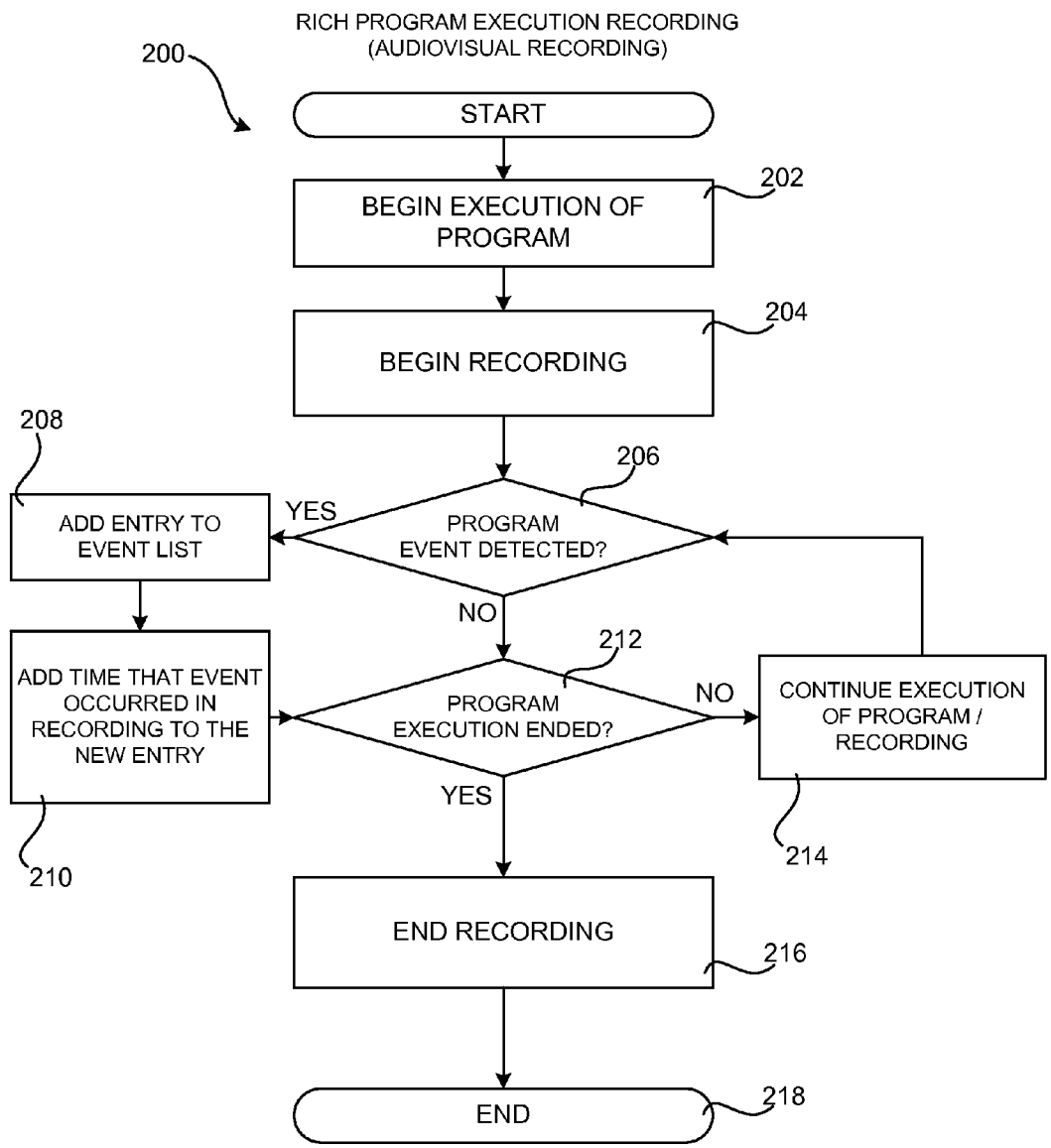
FIG. 2 is a flow diagram showing aspects of the operation of a program execution monitor for rich program execution recording, according to the embodiment shown in FIG. 1.

FIG. 2 is a flow diagram showing a routine 200 that illustrates aspects of the operation of the program execution monitor 114 for recording rich aspects of the execution of the program 104, according to one embodiment disclosed herein. It should be appreciated that the logical operations described herein with respect to FIG. 2, and the other FIGS. might be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where execution of the program 104 is started. The routine 200 then proceeds to operation 204, where the recording component 110 begins recording various aspects of the operation of the program 104, such as the audiovisual output 106 generated by the program 104, the input 108 received by the program, the sensor outputs 130, the contextual data 132, and/or any of the other data described above. As mentioned briefly above, the program execution monitor 114 might instruct the recording component 110 to begin recording once the program 104 has started executing. In other embodiments, the start of the execution of the program 104 might trigger the recording component 110 to begin recording. The start of the execution of the program 104 might also trigger the program execution monitor 114 to begin monitoring for program events 116.

From operation 204, the routine 200 proceeds to operation 206, where the program execution monitor 114 determines if a program event 116 has been detected. As mentioned above, the program events 116 might include input events, output events, system events, and other types of events specified by the event definitions 120. If the program execution monitor 114 detects an event at operation 206, the routine 200 proceeds to operation 208.

At operation 208, the program execution monitor 114 adds an entry to the event list 118 for the detected program event 116. As mentioned above, each entry in the event list 118 includes data that describes the program event 116 that occurred. Once the new entry in the event list 118 has been created, the routine 200 proceeds from operation 208 to operation 210, where the program execution monitor 114 adds the time in the recording 112 at which the detected program event 116 occurred to the newly created entry in the event list 118. In this way, the detected program event 116 is correlated with the time that the program event 116 occurred in the recording 112. Other information might also be added to the new entry, such as the type of event detected and/or other information. The routine 200 then proceeds from operation 210 to operation 212.

If, at operation 206, the program execution monitor 114 determines that a program event 116 has not been detected, the routine 200 proceeds from operation 206 to operation 212. At operation 212, the program execution monitor 114 determines if execution of the program 104 has stopped. If execution of the program 104 has not ended, the routine 200 proceeds from operation 212 to operation 214. At operation 214, execution of the program 104 is continued and, at operation 214, recording of the various types of data described above continues. From operation 214, the routine 200 proceeds back to operation 206.

If, at operation 212, the program execution monitor 114 determines that execution of the program 104 has ended, the routine 200 proceeds from operation 212 to operation 216, where recording of the data described above is ended. In this regard, the program execution monitor 114 might transmit an instruction to the recording component 110 instructing the recording component 110 to stop recording. The routine 200 then proceeds from operation 216 to operation 218, where it ends.

Figure 3:
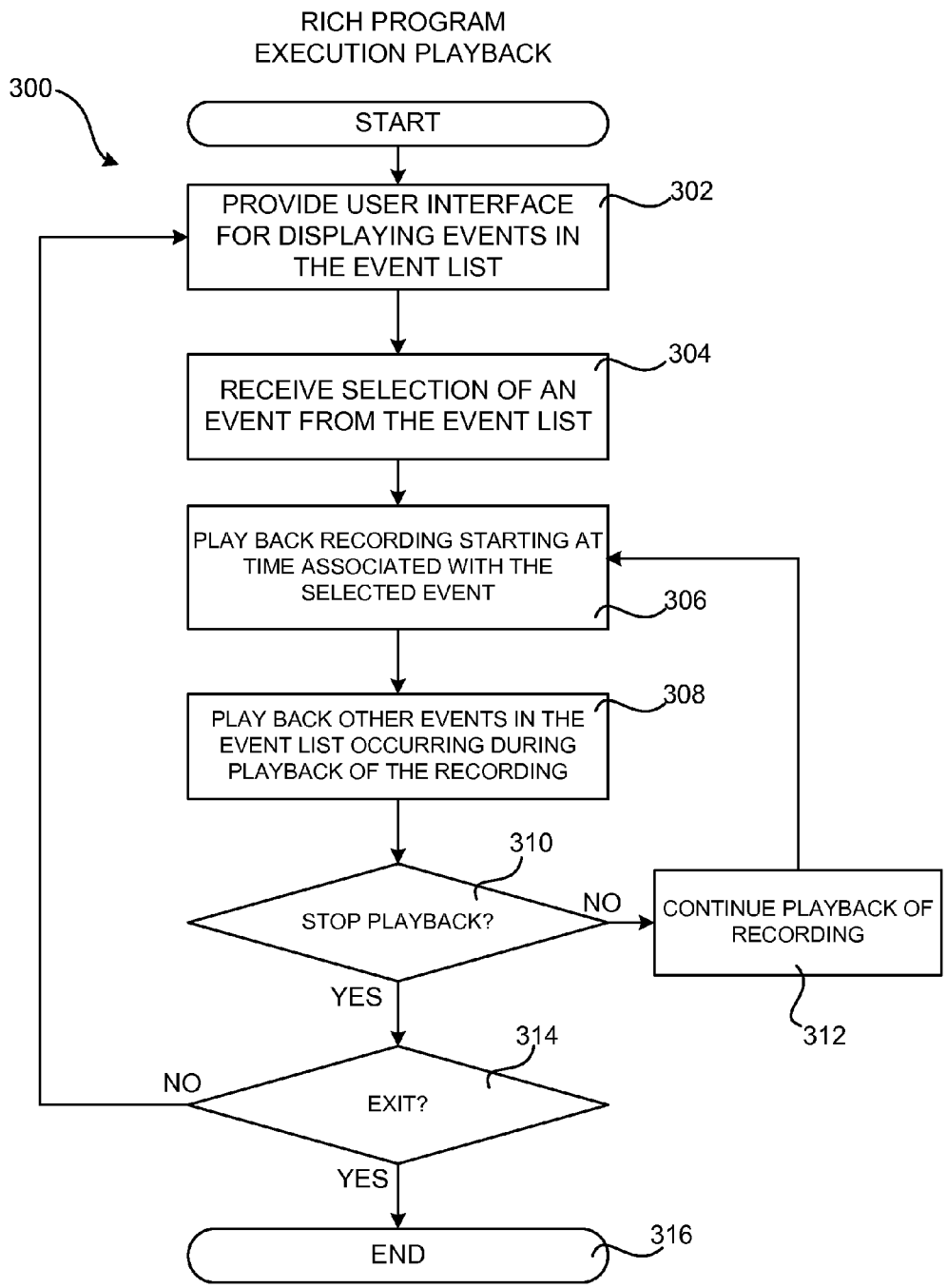
FIG. 3 is a flow diagram showing aspects of the operation of a playback component for rich playback of a recording of the execution of a software program, according to the embodiment shown in FIG. 1.

FIG. 3 is a flow diagram showing a routine 300 that illustrates aspects of the operation of the playback component 124 for rich playback of a recording 112 of the execution of a software program 104, according to one embodiment disclosed herein. The routine 300 begins at operation 302, where the playback component 124 provides a UI for displaying the entries in the event list 118. As mentioned above, the UI might provide functionality for allowing a user of the playback device 122 to select an event in the event list 118. A selection of an event in the event list 118 is received through the transport control UI 126 at operation 304. An event might be selected for playback in other ways in other embodiments. As mentioned above, the user might also be permitted to select which components of the recording 112 should be played back.

From operation 304, the routine 300 proceeds to operation 306, where the playback component 124 begins playback of the selected components of the recording 112 at or around the time associated with the event selected in the event list 118. The routine 300 then proceeds from operation 306 to operation 308, where the playback component 124 might also play back other events identified in the event list 118. For example, and as described above, the playback component 124 might play back certain output operations identified in the event list 118 that are not captured by the audiovisual portion of the recording 112. If the playback device 122 does not have software or hardware necessary to perform the actual output operations, the playback component 124 might overlay text on the audiovisual playback 128 identifying the operations. Other types of audio or visual indicators might also be provided to indicate the occurrence of an output operation.

From operation 308, the routine 300 proceeds to operation 310, where the playback component 124 determines whether a user has requested to stop playback of the recording 112. If a user has not requested to stop playback, the routine 300 proceeds from operation 310 to operation 312, where the playback component 124 continues to play back the recording 112. From operation 312, the routine 300 proceeds to operation 30, where the recording 112 might be continually played back in the manner described above until it ends.

If, at operation 310, the playback component 124 determines that a user has requested to stop playback (or the recording ends), the routine 300 proceeds to operation 314. At operation 314, the playback component 124 determines whether a user has requested to exit the playback component 124. If the user has not requested to exit and the recording has not ended, the routine 300 proceeds back to operation 302, where the user may be permitted to play back the recording 112 from another location defined in the event list 118. If the user has requested to exit, the routine 300 proceeds from operation 314 to operation 316, where it ends.

Figure 4:
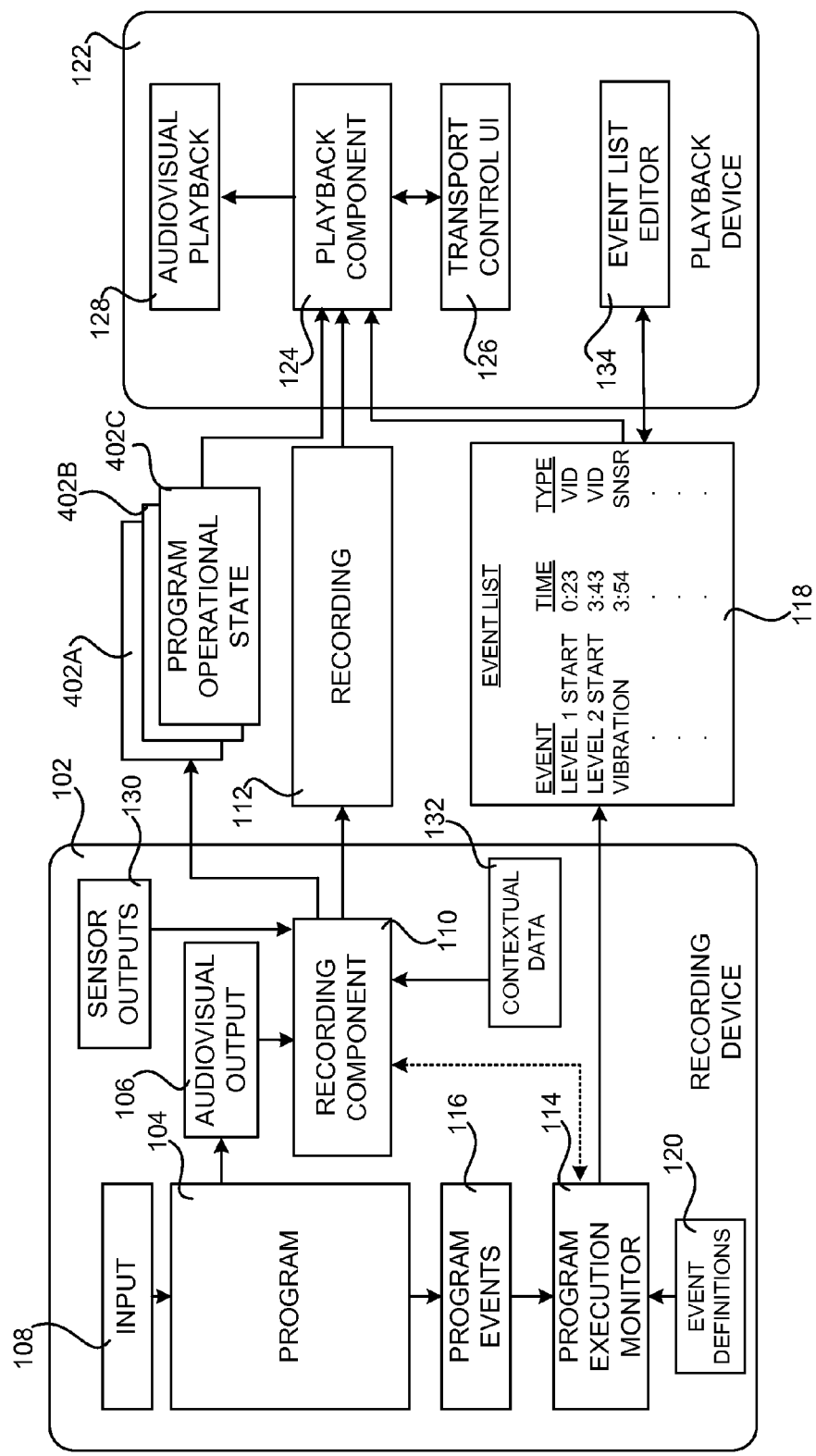
FIG. 4 is a software architecture diagram showing an overview of another illustrative mechanism described herein for rich recording and playback of the execution of a software program, according to another embodiment disclosed herein.

FIG. 4 is a software architecture diagram showing an overview of another illustrative mechanism described herein for rich recording and playback of the execution of a software program 104, according to another embodiment disclosed herein. In the embodiment shown in FIG. 4, the program execution monitor 114 is further configured to save the program operational state 402 of an executing program 104 each time a program event 116 is detected. As discussed briefly above, the program operational state 402 may include the contents of RAM of the recording device 102, the contents of CPU registers of a CPU in the recording device 102, and other data. The program operational state 402 can later be utilized to recreate the state of the program 104 at the time the program event 116 was detected and to re-start execution of the program 104 from that point in time. In the example shown in FIG. 4, three program events 116 have occurred and, therefore, three separate program operational states 402A-402C have been created. Each of the program operational states 402A-402C corresponds to a state of the program 104 at the time a program event 116 occurred.

When an event occurs, the program execution monitor 114 also creates an entry in an event list 118 identifying the detected program event 116 and the saved program operational state 402 of the program 104 at the time the event occurred. For example, the event list shown in FIG. 1 indicates that the program operational state 402A corresponds to a program event 116 generated at the start of a first level of the program 104, the program operational state 402B corresponds to a program event 116 generated at the start of a second level of the program 104, and the program operational state 402C corresponds to a program event 116 generated in response to an output event (i.e. the activation of a vibration device in the recording device 102).

In the embodiment shown in FIG. 4, the program execution monitor 114 might also utilize the recorded input 108 made to the program 104 for use in playback. For example, and as will be described in greater detail below, the recorded input 108 might be simulated on the playback device 122 once the program operation state 402 for a particular program event 116 has been loaded on the playback device 122 and execution of the program 104 has been restarted.

In order to play back the execution of the program in the embodiment shown in FIG. 4, the playback component 124 may provide a UI 126 for presenting some or all of the events identified in the event list 118 in the manner described above. A user may be permitted to select one of the events in the event list 118 through the UI 126. In response to receiving such a selection, the playback component 124 loads the program operational state 402 that is associated with the selected event in the event list 118. For example, the playback component 124 may load the contents of the RAM, the CPU registers, and other data in order to recreate the state of the program 104 at the time the program operational state 402 was created.

Once the program operational state 402 for a particular event has been loaded on the playback device 122, the execution of the program 104 may be restarted at precisely the time that the corresponding event occurred. In this way, a user can restart execution of the program 104 at or around the time a detected program event 116 occurred during a previous execution of the program 104. Additionally, and as described briefly above, input 108 made to the program 104 recorded during a previous execution of the program 104 may be played back to the program 104 executing on the playback device 122. In this way, the program 104 can be operated on the playback device 122 in the same fashion as it was previously operated on the recording device 102.

The mechanism illustrated in FIG. 4 might also be utilized as promotional material in conjunction with an advertisement for the program 104. For example, a page on an e-commerce site or an application store might be configured to load and execute a program operational state 402 for a particular event on a customer device in the manner described above. In this way, a customer of the e-commerce site or an application store could experience the actual operation of the program 104. Additional details regarding the mechanism illustrated in FIG. 4 will be provided below with regard to FIGS. 5 and 6.

Figure 5:
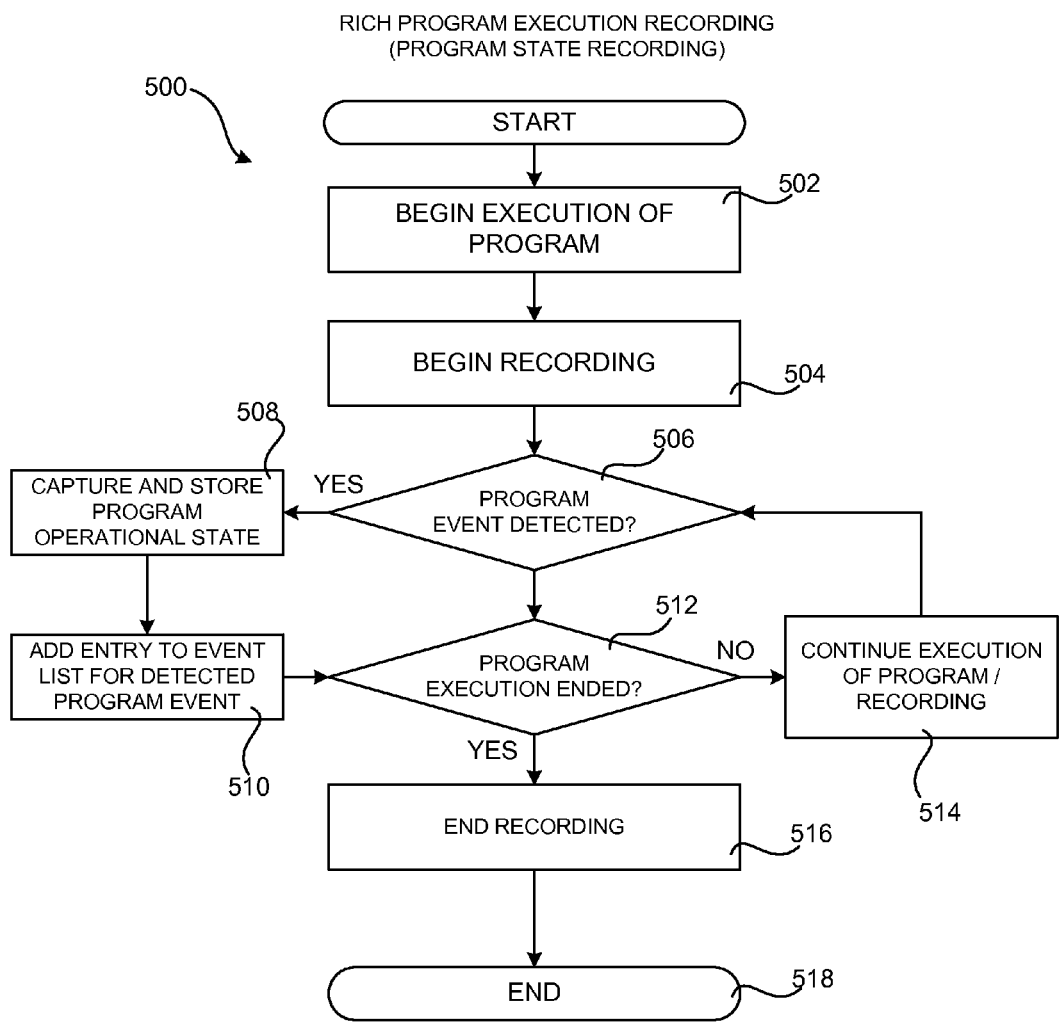
FIG. 5 is a flow diagram showing aspects of the operation of a program execution monitor for rich program execution recording, according to the embodiment shown in FIG. 4.

FIG. 5 is a flow diagram showing a routine 500 that illustrates aspects of the operation of the program execution monitor 114 for rich program execution recording, according to the embodiment shown in FIG. 4. The routine 500 begins at operation 502, where execution of the program 104 is started. The routine 500 then proceeds to operation 504, where the program execution monitor 114 begins recording the various types of information described above such as, but not limited to, the audiovisual output 106 of the program 104, input 108 made to the program 104, the sensor outputs 130, the contextual data 132, and/or other data. The start of the execution of the program 104 also triggers the program execution monitor 114 to begin monitoring for program events 116.

From operation 504, the routine 500 proceeds to operation 506, where the program execution monitor 114 determines if a program event 116 has been detected. If the program execution monitor 114 detects an event at operation 506, the routine 500 proceeds to operation 508.

At operation 508, the program execution monitor 114 captures and stores the program operational state 402 for the program 104 at the time the program event 116 is detected. As mentioned above, this might include storing the contents of RAM, CPU registers, and other data that can be utilized to restart execution of the program 104 on the playback device 122. The program execution monitor 114 also creates a new entry in the event list 118 for the newly detected program event 116. The new entry includes data identifying the detected program event 116 along with an identifier for the corresponding saved program operational state 402. The new entry in the event list 118 might also contain other information, such as that described above. This occurs at operation 510. The routine 500 then proceeds from operation 510 to operation 512.

If, at operation 506, the program execution monitor 114 determines that a program event 116 has not been detected, the routine 500 proceeds from operation 506 to operation 512. At operation 512, the program execution monitor 114 determines if execution of the program 104 has ended. If execution of the program 104 has not ended, the routine 500 proceeds from operation 512 to operation 514. At operation 514, execution of the program 104 is continued. Additionally, the program execution monitor 114 continues recording the various types of information described above at operation 514. From operation 514, the routine 500 proceeds back to operation 506 where the program execution monitor 114 might continue to monitor for the occurrence of program events 116.

If, at operation 512, the program execution monitor 114 determines that execution of the program 104 has ended, the routine 500 proceeds from operation 512 to operation 516, where recording is stopped. The routine 500 then proceeds from operation 516 to operation 518, where it ends.

Figure 6:
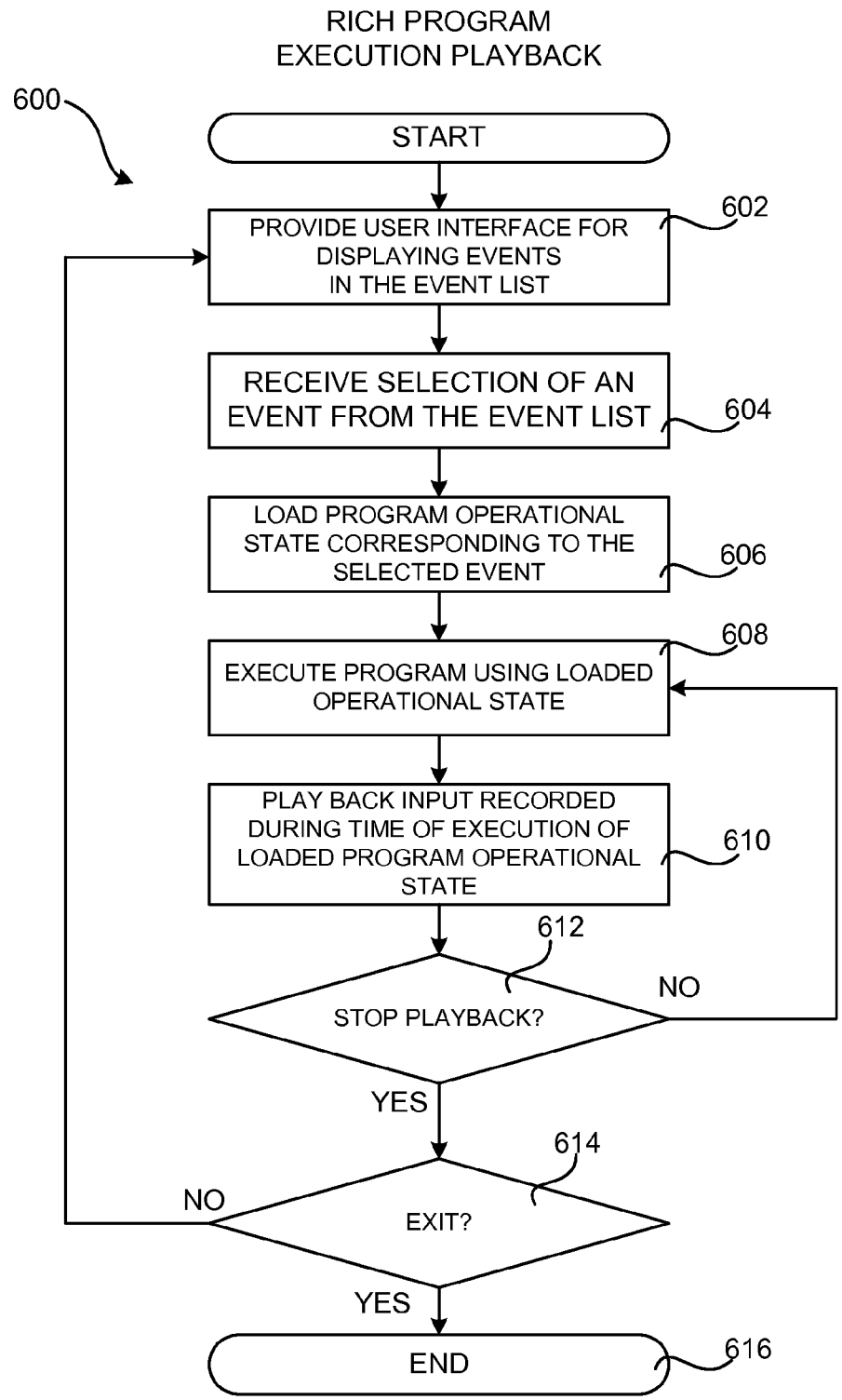
FIG. 6 is a flow diagram showing aspects of the operation of a playback component for rich playback of a recording of the execution of a software program, according to the embodiment shown in FIG. 4.

FIG. 6 is a flow diagram showing a routine 600 that illustrates aspects of the operation of the playback component 124 for rich playback of a recording 112 of the execution of a software program 104, according to the embodiment shown in FIG. 4. The routine 600 begins at operation 602, where the playback component 124 provides the UI 126 described above for displaying the entries in the event list 118. As mentioned above, the UI might provide functionality for allowing a user of the playback device 122 to select an event in the event list 118. The selection of an event in the event list 118 is received through the UI 126 at operation 604. An event in the event list 118 might also be selected in other ways.

From operation 604, the routine 600 proceeds to operation 606, where the playback component 124 loads the program operational state 402 corresponding to the selected event. As mentioned above, this might include loading the stored contents of RAM on the playback device 122, loading the stored CPU registers, and loading other data to recreate the operational state of the program 104 at the time the selected event was detected. In some embodiments, a virtual machine or an emulator is utilized on the playback device 122 to load the program operational state 402. A virtual machine or an emulator may be utilized, for instance, when the hardware of the recording device 102 is not the same as the hardware of the playback device 122. The virtual machine or emulator might be configured to emulate the hardware of the recording device 102. Once the operational state 402 has been loaded, the routine 600 proceeds to operation 608.

At operation 608, execution of the program 104 is started on the playback device 122 utilizing the restored program operational state 402. In this way, the program 104 begins executing at the point at which it was executing when the program operational state 402 was created. Once the program has started executing, the routine 600 proceeds from operation 608 to operation 610, where the playback component 124 may play back recorded input 108 to the program 104 executing on the playback device 122. In this way, input 108 received at the program 104 may be simulated on the playback device 122 and provided to the program 104 as if the input were actually being made on the playback device 122.

From operation 610, the routine 600 proceeds to operation 612, where the playback component 124 determines whether a user has requested to stop execution of the program 104 on the playback device 122. If a user has not requested to stop execution of the program 104, the routine 600 proceeds from operation 612 to operation 608, where the playback component 124 continues to play back the recorded input 108. From operation 608, the routine 600 proceeds back to operation 610 where other recorded input 108 might be continually played back in the manner described above.

If, at operation 612, the playback component 124 determines that a user has requested to stop execution of the program 104, the routine 600 proceeds to operation 614. At operation 614, the playback component 124 determines whether a user has requested to exit the playback component 124. If the user has not requested to exit, the routine 600 proceeds back to operation 602, where the user may be permitted to begin execution of the program 104 at another location corresponding to another event in the event list 118. If the user has requested to exit, the routine 600 proceeds from operation 614 to operation 616, where it ends.

Figure 7:
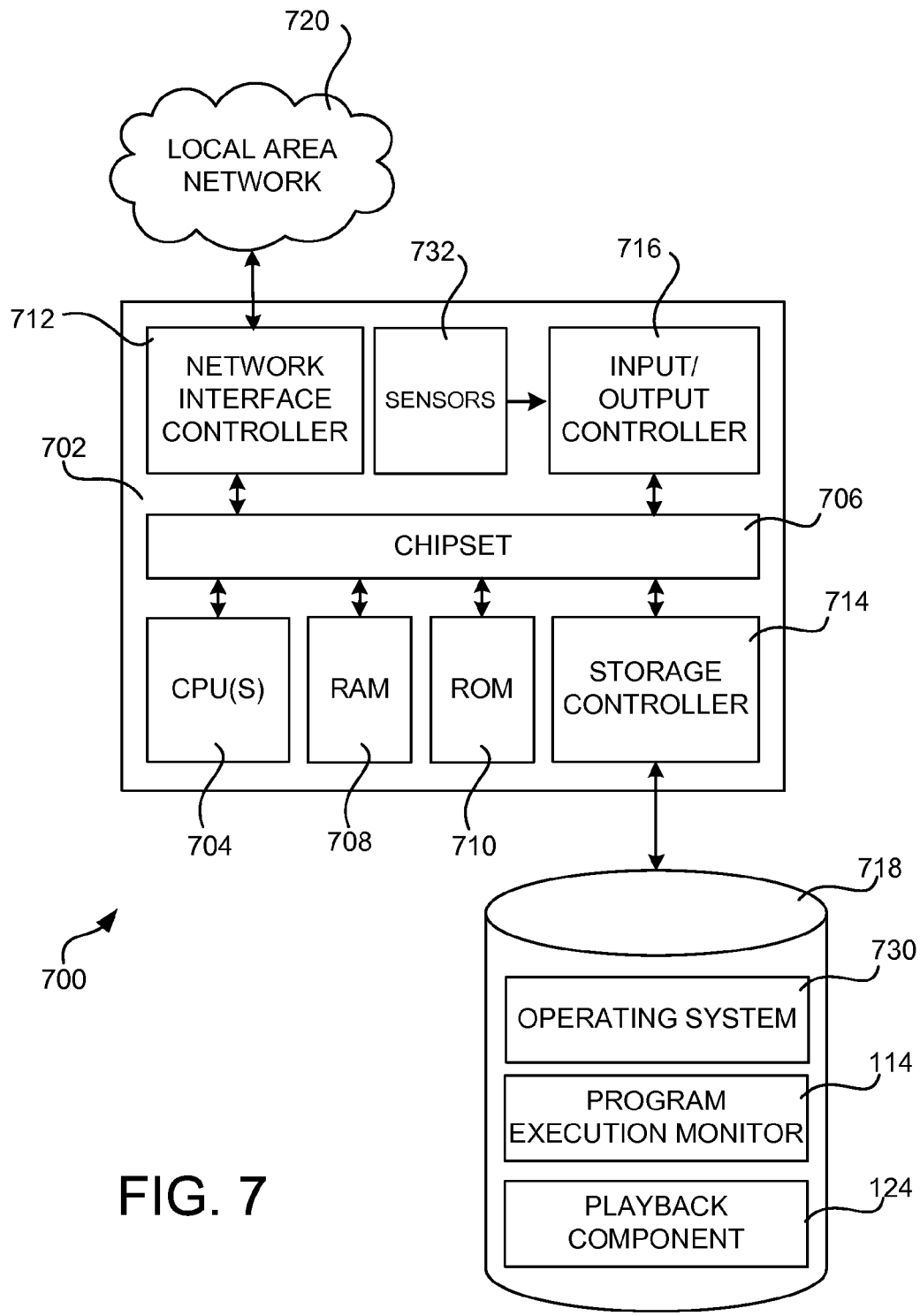
FIG. 7 is a computer architecture diagram showing an illustrative computer hardware architecture for implementing a computing device that might be utilized to implement aspects of the various embodiments presented herein.

FIG. 7 shows an example computer architecture for a computer 700 capable of executing the program components described above for rich recording and playback of the execution of a program 104. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 7 may be utilized to execute the program 104, the program execution monitor 114, the playback component 124, and/or the other components shown in FIGS. 1 and 2 and described above.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the program 104, the program execution monitor 114, the playback component 124, and/or any of the other software components and data described above. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above with regard to FIGS. 2, 3, 5, and 6. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. The input/output controllers 716 might also receive input from a number of sensors 732 such as, but not limited to, a camera, a microphone, a GPS sensor, a gyroscope, an accelerometer, an ambient light sensor, a temperature sensor, an altitude sensor, a magnetic compass, and other types of sensors. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for rich recording and playback of program execution have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereupon which, when executed by a computer, cause the computer to:
    execute a program on the computer;
    during execution of the program on the computer, create a recording comprising an audiovisual output of the program;
    determine if an event has occurred during the execution of the program;
    in response to determining that an event has occurred during execution of the program, create an entry in an event list comprising data identifying the event and a time in the recording of the audiovisual output of the program at which the event occurred;
    provide a user interface for selecting an entry in the event list;
    receive a selection of an entry in the event list by way of the user interface; and
    cause the recording of the audiovisual output of the program to play back beginning at a time specified by the selected entry in the event list in response to receiving the selection of the entry in the event list.

2. The computer-readable storage medium of claim 1, having further computer-executable instructions stored thereupon which, when executed by a computer, cause the computer to:
    identify an entry in the event list having an associated time occurring during the playback of the recording of the audiovisual output of the program; and
    play back an event specified by the identified entry.

3. The computer-readable storage medium of claim 1, wherein the events comprise one or more of events defined by a programmer of the program and generated during the execution of the program, input events, output events, and system events.

4. The computer-readable storage medium of claim 1, wherein the playback of the recording of the audiovisual output of the program is presented in conjunction with an advertisement for the program.

5. The computer-readable storage medium of claim 1, wherein the recording further comprises a recording of one or more sensor outputs captured during execution of the program on the computer, and wherein the sensor outputs are also played back beginning at the time specified by the selected entry in the event list in response to receiving the selection of the entry in the event list.

6. The computer-readable storage medium of claim 1, wherein the recording further comprises a recording of contextual data captured during execution of the program on the computer, and wherein the contextual data is also played back beginning at the time specified by the selected entry in the event list in response to receiving the selection of the entry in the event list.

7. A computer-implemented method for recording and playback of the execution of a program, the method comprising performing computer-implemented operations for:
    causing the program to be executed;
    creating a recording of an audiovisual output of the program during the execution of the program;
    detecting an event occurring during the execution of the program; and
    creating an entry in an event list in response to detecting the event occurring during the execution of the program, the entry in the event list comprising an identity of the event and a time in the recording of the audiovisual output of the program at which the event occurred.

8. The computer-implemented method of claim 7, wherein the event comprises an event defined by a programmer of the program and generated by the execution of the program.

9. The computer-implemented method of claim 7, wherein the event comprises an input being receiving by the program.

10. The computer-implemented method of claim 7, wherein the event comprises an output being generated by the program.

11. The computer-implemented method of claim 7, wherein the event comprises a system event.

12. The computer-implemented method of claim 7, further comprising:
    providing a user interface for presenting at least a portion of the event list;
    receiving a selection of an entry in the event list by way of the user interface; and
    in response to receiving the selection of the entry in the event list, playing back the recording of the audiovisual output of the program beginning at a time specified by the selected entry in the event list.

13. The computer-implemented method of claim 7, further comprising recording sensor inputs received during the execution of the program.

14. The computer-implemented method of claim 7, further comprising contextual data during the execution of the program.

15. The computer-implemented method of claim 7, further comprising generating a transcript of operations performed by the program during the execution.

16. The computer-implemented method of claim 7, further comprising saving an operational state of the program in response to detecting an event occurring during the execution of the program.

17. A computer-implemented method for recording and playback of the execution of a program, the method comprising performing computer-implemented operations for:
    causing the program to be executed;
    recording one or more of sensor outputs, audiovisual output, and contextual data during execution of the program;
    detecting an event occurring during the execution of the program; and in response to detecting the event occurring during the execution of the program,
 saving an operational state of the program at the time the event is detected and
 creating an entry in an event list, the entry in the event list comprising data identifying the event and data identifying the saved operational state of the program.

18. The computer-implemented method of claim 17, further comprising:
 providing a user interface for presenting at least a portion of the event list;
 receiving a selection of an entry in the event list by way of the user interface; and
 in response to receiving the selection of the entry in the event list, loading a saved operational state of the program associated with the selected entry in the event list and executing the program using the loaded operational state.

19. The computer-implemented method of claim 18, further comprising:
 recording one or more inputs to the program received during the execution of the program; and
 playing back the recorded one or more inputs when the program is executed using the loaded operational state.

* * * * *